US012592055B2

(12) United States Patent
Bjelcevic et al.

(10) Patent No.: US 12,592,055 B2
(45) Date of Patent: Mar. 31, 2026

(54) MACHINE-LEARNING MODEL ANNOTATION AND TRAINING TECHNIQUES

(71) Applicant: NCR Voyix Corporation, Atlanta, GA (US)

(72) Inventors: Stefan Bjelcevic, Roswell, GA (US); Hunter Blake Wilson Germundsen, Atlanta, GA (US); Christian Lee McDaniel, Atlanta, GA (US); Brent Vance Zucker, Roswell, GA (US)

(73) Assignee: NCR Voyix Corporation, Atlanta, GA (US)

( * ) Notice: Subject to any disclaimer, the term of this patent is extended or adjusted under 35 U.S.C. 154(b) by 959 days.

(21) Appl. No.: 17/729,237

(22) Filed: Apr. 26, 2022

(65) Prior Publication Data

US 2023/0252760 A1 Aug. 10, 2023

Related U.S. Application Data

(63) Continuation-in-part of application No. 17/665,145, filed on Feb. 4, 2022.

(51) Int. Cl.
*G06V 10/764* (2022.01)
*G06V 10/42* (2022.01)

(52) U.S. Cl.
CPC .......... *G06V 10/764* (2022.01); *G06V 10/421* (2022.01)

(58) Field of Classification Search
CPC ...... G06V 10/82; G06V 10/764; G06V 10/16; G06V 10/255; G06V 10/421
See application file for complete search history.

(56) References Cited

U.S. PATENT DOCUMENTS 11,481,751 B1 * 10/2022 Chaubard .............. G06V 10/82
2019/0108396 A1 4/2019 Dal Mutto et al.

OTHER PUBLICATIONS

Xiao Z, Zhao J, Sun G. Mask Data Priming Network for Automatic Check-Out. Preprints. Jun. 14, 2020. (Year: 2020).*
Li, Congcong, et al. "Data priming network for automatic check-out." Proceedings of the 27th ACM international conference on multimedia. 2019. (Year: 2019).*
EP Examination Report dated Feb. 14, 2025.

* cited by examiner

*Primary Examiner* — Tracy Mangialaschi
(74) *Attorney, Agent, or Firm* — Schwegman Lundberg & Woessner, P.A.

(57) ABSTRACT

A single item image is captured of an item situated within a given zone of a transaction area is captured, each different zone for each given item is associated a plurality of single item images captured by different cameras at different angles and perspectives of the transaction area. The single item images are passed to an existing segmentation Machine-Learning Model (MLM) and accurate masks for the items produced by the existing MLM are retained. A background image of an empty transaction area is obtained, each retained single item image is cropped and superimposed into the background image with one or more different cropped and superimposed singe item images creating a composite multi-item image. The composite multi-item images are labeled to identify the boundaries of each single item image and the existing segmentation MLM is trained on the composite multi-item and labeled images producing an enhanced segmentation MLM.

12 Claims, 3 Drawing Sheets

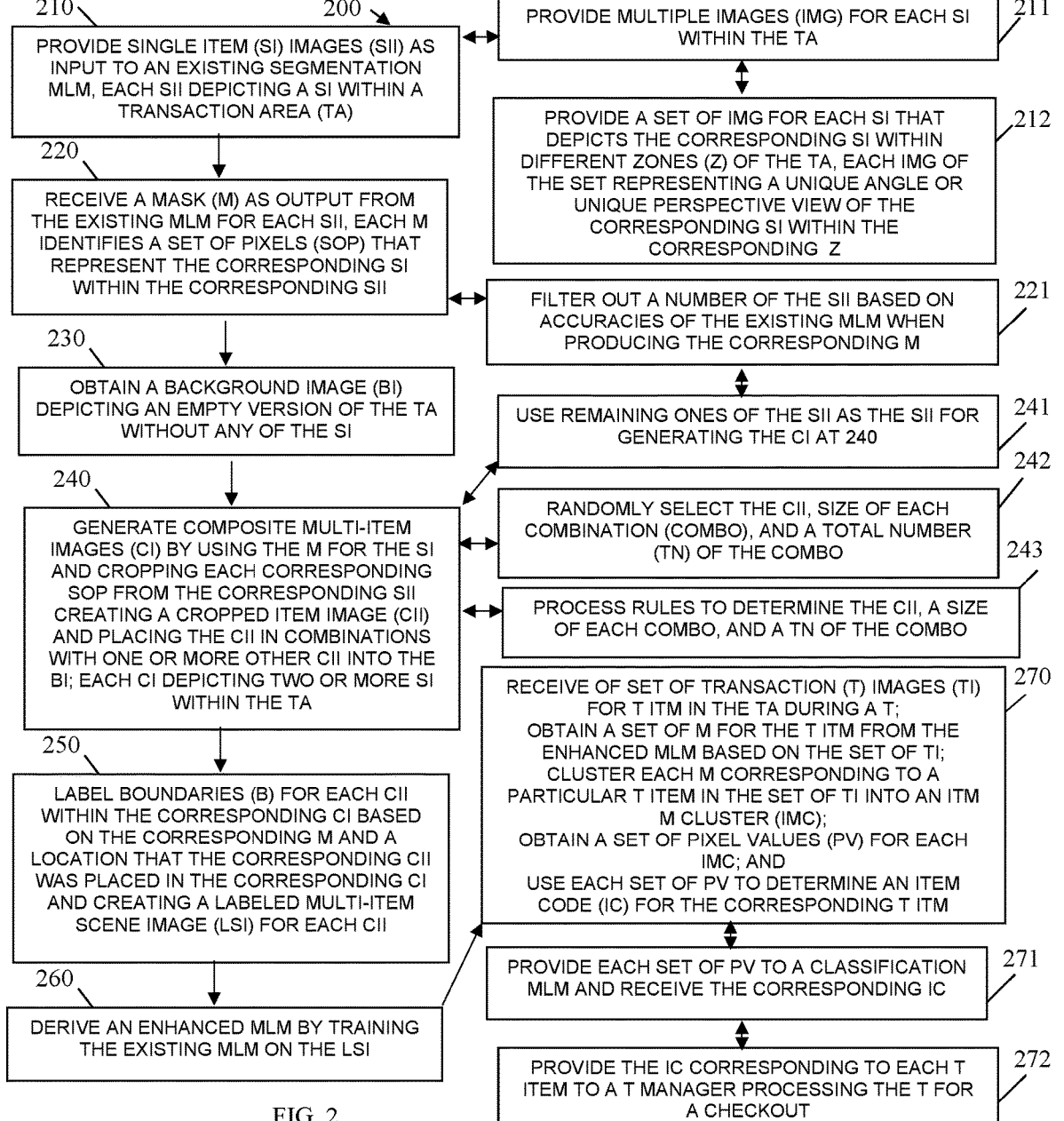

210

200

PROVIDE SINGLE ITEM (SI) IMAGES (SII) AS INPUT TO AN EXISTING SEGMENTATION MLM, EACH SII DEPICTING A SI WITHIN A TRANSACTION AREA (TA)

220

RECEIVE A MASK (M) AS OUTPUT FROM THE EXISTING MLM FOR EACH SII, EACH M IDENTIFIES A SET OF PIXELS (SOP) THAT REPRESENT THE CORRESPONDING SI WITHIN THE CORRESPONDING SII

230

OBTAIN A BACKGROUND IMAGE (BI) DEPICTING AN EMPTY VERSION OF THE TA WITHOUT ANY OF THE SI

240

GENERATE COMPOSITE MULTI-ITEM IMAGES (CI) BY USING THE M FOR THE SI AND CROPPING EACH CORRESPONDING SOP FROM THE CORRESPONDING SII CREATING A CROPPED ITEM IMAGE (CII) AND PLACING THE CII IN COMBINATIONS WITH ONE OR MORE OTHER CII INTO THE BI; EACH CI DEPICTING TWO OR MORE SI WITHIN THE TA

250

LABEL BOUNDARIES (B) FOR EACH CII WITHIN THE CORRESPONDING CI BASED ON THE CORRESPONDING M AND A LOCATION THAT THE CORRESPONDING CII WAS PLACED IN THE CORRESPONDING CI AND CREATING A LABELED MULTI-ITEM SCENE IMAGE (LSI) FOR EACH CII

260

DERIVE AN ENHANCED MLM BY TRAINING THE EXISTING MLM ON THE LSI

211
PROVIDE MULTIPLE IMAGES (IMG) FOR EACH SI WITHIN THE TA

212
PROVIDE A SET OF IMG FOR EACH SI THAT DEPICTS THE CORRESPONDING SI WITHIN DIFFERENT ZONES (Z) OF THE TA, EACH IMG OF THE SET REPRESENTING A UNIQUE ANGLE OR UNIQUE PERSPECTIVE VIEW OF THE CORRESPONDING SI WITHIN THE CORRESPONDING Z

221
FILTER OUT A NUMBER OF THE SII BASED ON ACCURACIES OF THE EXISTING MLM WHEN PRODUCING THE CORRESPONDING M

241
USE REMAINING ONES OF THE SII AS THE SII FOR GENERATING THE CI AT 240

242
243
RANDOMLY SELECT THE CII, SIZE OF EACH COMBINATION (COMBO), AND A TOTAL NUMBER (TN) OF THE COMBO

PROCESS RULES TO DETERMINE THE CII, A SIZE OF EACH COMBO, AND A TN OF THE COMBO

270
RECEIVE OF SET OF TRANSACTION (T) IMAGES (TI) FOR T ITM IN THE TA DURING A T; OBTAIN A SET OF M FOR THE T ITM FROM THE ENHANCED MLM BASED ON THE SET OF TI; CLUSTER EACH M CORRESPONDING TO A PARTICULAR T ITEM IN THE SET OF TI INTO AN ITM M CLUSTER (IMC); OBTAIN A SET OF PIXEL VALUES (PV) FOR EACH IMC; AND USE EACH SET OF PV TO DETERMINE AN ITEM CODE (IC) FOR THE CORRESPONDING T ITM

271
PROVIDE EACH SET OF PV TO A CLASSIFICATION MLM AND RECEIVE THE CORRESPONDING IC

272
PROVIDE THE IC CORRESPONDING TO EACH T ITEM TO A T MANAGER PROCESSING THE T FOR A CHECKOUT

FIG. 2

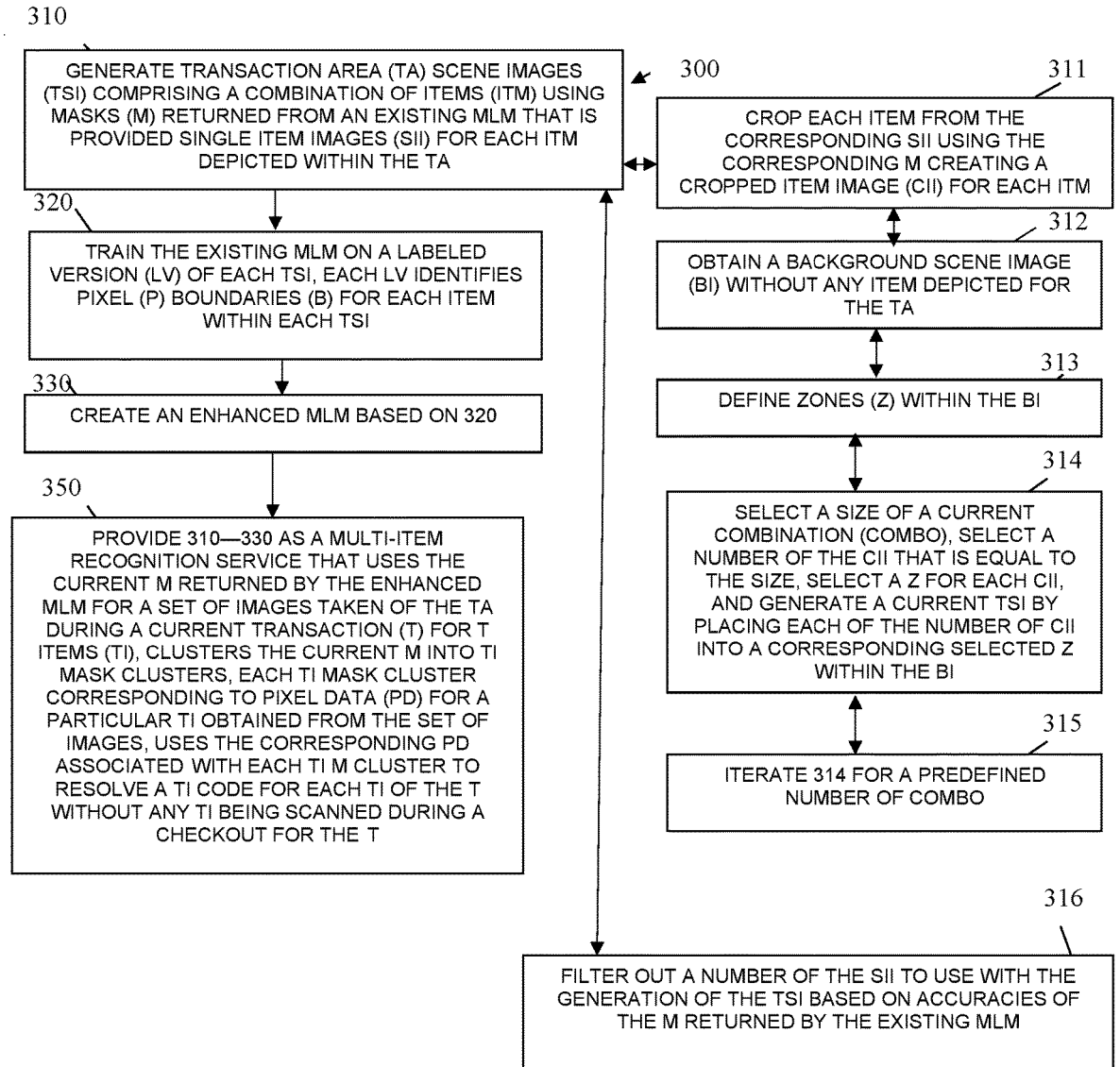

310

GENERATE TRANSACTION AREA (TA) SCENE IMAGES (TSI) COMPRISING A COMBINATION OF ITEMS (ITM) USING MASKS (M) RETURNED FROM AN EXISTING MLM THAT IS PROVIDED SINGLE ITEM IMAGES (SII) FOR EACH ITM DEPICTED WITHIN THE TA

320

TRAIN THE EXISTING MLM ON A LABELED VERSION (LV) OF EACH TSI, EACH LV IDENTIFIES PIXEL (P) BOUNDARIES (B) FOR EACH ITEM WITHIN EACH TSI

330

CREATE AN ENHANCED MLM BASED ON 320

350

PROVIDE 310—330 AS A MULTI-ITEM RECOGNITION SERVICE THAT USES THE CURRENT M RETURNED BY THE ENHANCED MLM FOR A SET OF IMAGES TAKEN OF THE TA DURING A CURRENT TRANSACTION (T) FOR T ITEMS (TI), CLUSTERS THE CURRENT M INTO TI MASK CLUSTERS, EACH TI MASK CLUSTER CORRESPONDING TO PIXEL DATA (PD) FOR A PARTICULAR TI OBTAINED FROM THE SET OF IMAGES, USES THE CORRESPONDING PD ASSOCIATED WITH EACH TI M CLUSTER TO RESOLVE A TI CODE FOR EACH TI OF THE T WITHOUT ANY TI BEING SCANNED DURING A CHECKOUT FOR THE T

300

311

CROP EACH ITEM FROM THE CORRESPONDING SII USING THE CORRESPONDING M CREATING A CROPPED ITEM IMAGE (CII) FOR EACH ITM

312

OBTAIN A BACKGROUND SCENE IMAGE (BI) WITHOUT ANY ITEM DEPICTED FOR THE TA

313

DEFINE ZONES (Z) WITHIN THE BI

314

SELECT A SIZE OF A CURRENT COMBINATION (COMBO), SELECT A NUMBER OF THE CII THAT IS EQUAL TO THE SIZE, SELECT A Z FOR EACH CII, AND GENERATE A CURRENT TSI BY PLACING EACH OF THE NUMBER OF CII INTO A CORRESPONDING SELECTED Z WITHIN THE BI

315

ITERATE 314 FOR A PREDEFINED NUMBER OF COMBO

316

FILTER OUT A NUMBER OF THE SII TO USE WITH THE GENERATION OF THE TSI BASED ON ACCURACIES OF THE M RETURNED BY THE EXISTING MLM

FIG. 3

MACHINE-LEARNING MODEL ANNOTATION AND TRAINING TECHNIQUES

RELATED APPLICATIONS

The present application is Continuation-In-Part (CIP) of application Ser. No. 17/665,145 entitled "Multi-Item Product Recognition for Checkouts" filed on Feb. 4, 2022, the disclosure of which is incorporated in its entirety herein and below.

BACKGROUND

To train a Machine-Learning Model (MLM) to make predictive output on input data provided requires a lot of work. The expected output that the MLM is supposed to produce is labeled within the training data, such that the other input data provided during training can be used to derive algorithms and weighting factors for the MLM to produce the corresponding labeled data (expected output). Thus, MLMs require a lot of labeled data for training. This can be a very tedious and time-consuming manual task.

For a segmentation MLM that is trained to receive and image and place masks around objects detected in the image (boundaries) requires a substantial amount of human action to label the training images and a substantial amount of human verification on the output produced by the segmentation model.

This can be even more laborious if not impractical to accurately train a given segmentation MLM when the inputted image comprises multiple objects and each object requires the proper mask. This is because training would typically require all combinations of the objects to be present within the labeled training data (training images). But this is not feasible nor practical, thus most segmentation MLMs have limited applications comprising only one to a few objects within any given image to produce a decent accuracy in properly identifying the boundaries for the single or the few objects within the image.

SUMMARY

In various embodiments, a system and methods for Machine-Learning Model (MLM) annotation and training techniques are presented.

According to an embodiment, a method for a MLM annotation and training technique is provided. Single item images are provided as input to an existing segmentation MLM; each single item image depicting a single item within a transaction area. A mask is received as output from the existing segmentation MLM for each single item image; each mask identifies a set of pixels that represents the corresponding single item within the corresponding single item image. A background image is obtained, the background image depicting an empty version of the transaction area without any of the single items. Composite multi-item images are generated by using the masks for the single items and cropping the corresponding set of pixels from the corresponding single item image creating a cropped item image and placing the cropped item image in combinations within one or more other cropped item images into the background image; each composite multi-item image depicting two or more of the single items within the transaction area Boundaries are labeled for each cropped item image within the corresponding composite multi-item image based on the corresponding mask and a location that the corresponding cropped item image was placed in the corresponding composite multi-item image and creating a labeled multi-item scene image for each composite multi-item image. An enhanced segmentation MLM is derived by training the existing segmentation MLM on the labeled multi-item scene images.

BRIEF DESCRIPTION OF THE DRAWINGS

FIG. 2 is a diagram of a method for a MLM annotation and training technique, according to an example embodiment.

FIG. 3 is a diagram of another method for a MLM annotation and training technique, according to an example embodiment.

DETAILED DESCRIPTION

Figure 1:
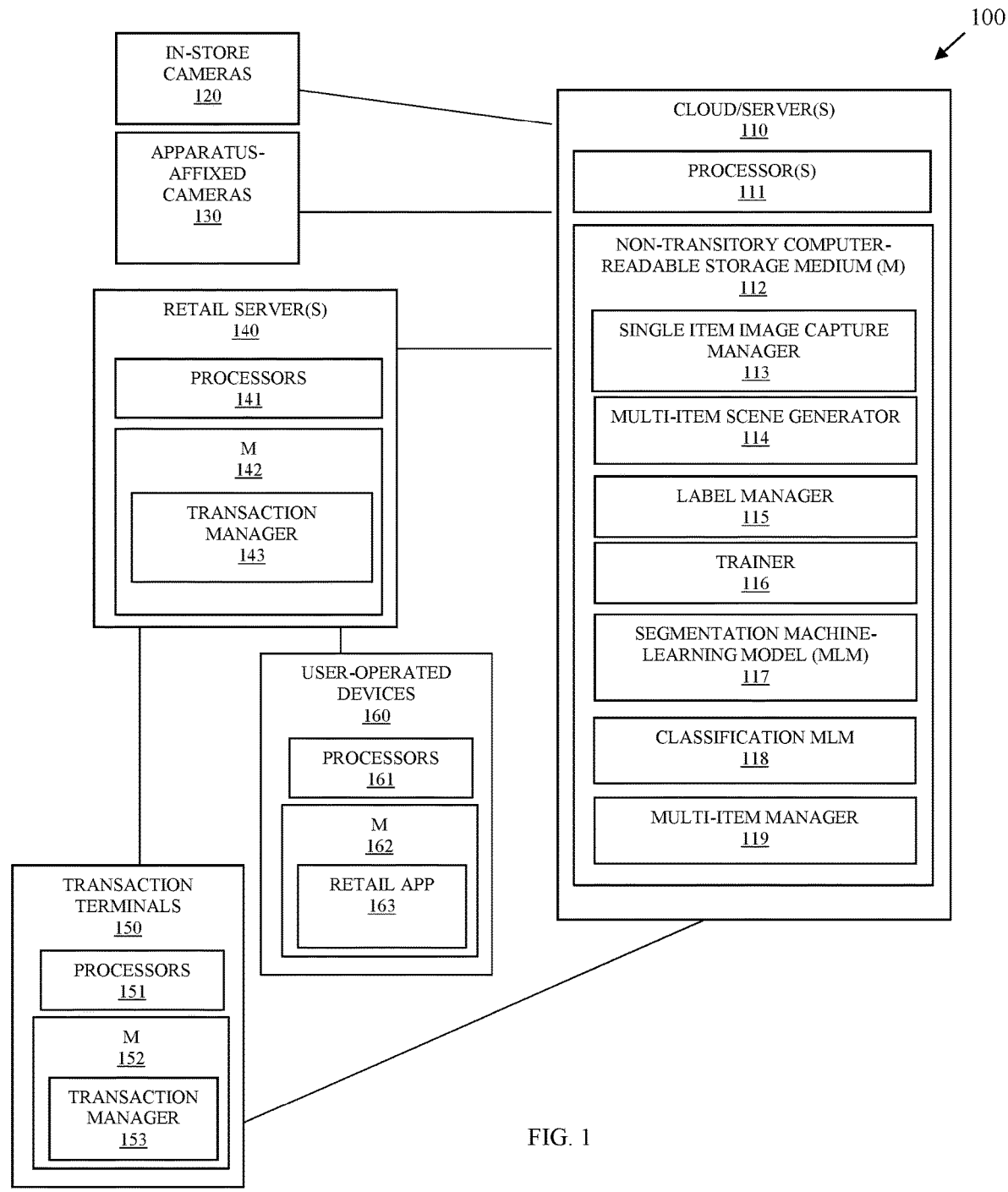
FIG. 1 is a diagram of a system for a MLM annotation and training technique, according to an example embodiment.

FIG. 1 is a diagram of a system 100 for a MLM annotation and training technique, according to an example embodiment. It is to be noted that the components are shown schematically in greatly simplified form, with only those components relevant to understanding of the embodiments being illustrated.

Furthermore, the various components (that are identified in system/platform 100) are illustrated and the arrangement of the components are presented for purposes of illustration only. It is to be noted that other arrangements with more or less components are possible without departing from the teachings of a MLM annotation and training technique, presented herein and below.

As used herein a "scene" refers to a defined area where a set or multi-items of a customer are being monitored through multiple images taken at multiple different angles. The multi-items can be stationary or can be moving with the customer in a basket, a cart, in their hands and arms, or in a bag. The area can be any predefined shape, predefined size, and predefined dimensions.

System 100 illustrates techniques by which a segmentation MLM can be trained more efficiently using programmatic techniques some of which would be impossible with existing manual MLM annotations and training. A single item of a plurality of items is placed in one of a plurality of zones within a transaction area and separate cameras at different angles and perspectives of the transaction area capture multiple images of the single item within each zone. The images from the zones for the item are passed to a generic segmentation MLM and the resulting masks in each image returned as output from the generic segmentation MLM. Acceptable or accurate masks are flagged and retained for further training of the generic segmentation model to create an enhanced segmentation MLM and unacceptable or inaccurate masks are discarded. The single item is then moved to a next zone and the process repeats until the single item was captured in multiple images in each of the zones. A next item is obtained, and the process is repeated. The flagged images represent a large corpus of saved images for the items in each of the zones for which accuracy of the enhanced segmentation MLM is acceptable.

Because each mask represents the pixels within a given image for a given item in a specific zone, the pixels representing of the given item can be programmatically cropped and extracted as just an item image for the given item. The item images can then be superimposed within a background image where the images were original captured by the cameras to create a scene of the background with the superimposed items artificially inserted into a single training image. The mask data for each item artificially placed within the single training image allows for the outline of each item (pixel outline) to be programmatically labeled within the training image because the item image size in pixels is known and the location it was superimposed into the background image is known. The programmatically created and labeled multi-item scenes can then be used in another training session with the enhanced segmentation model, such that multi-item scenes in different combinations have each item in the scene accurately masked by the enhanced segmentation model.

This markedly reduces the time and effort required to create a robust segmentation model with very little to no manual effort involved. With current techniques in the industry this is not possible. Furthermore, the robustness of training and accuracy achieved by the enhanced segmentation MLM provided herein are infeasible, impractical, and impossible to achieve with existing techniques in the industry.

Various embodiments are now discussed in greater detail with reference to FIG. 1.

System 100 comprises a cloud/server 110, in-store cameras 120, apparatus-affixed cameras 130, one or more retail server 140, transaction terminals 150, and user-operated devices 160.

Cloud/Server 110 comprises a processor 111 and a non-transitory computer-readable storage medium 112. Medium 112 comprises executable instructions for a single item image capture manager 113, multi-item scene generator 114, a label manager 115, trainer 116, a segmentation MLM 117, a classification MLM, 118, and a multi-item manager 119. The executable instructions when provided or obtained by the processor 111 from medium 112 cause the processor 111 to perform operations discussed herein with respect to 113-119.

In-store cameras 120 may be stationary cameras placed throughout a store, such as overhead cameras situated overhead of transaction areas of terminals 150 and/or situated along side countertops associated with terminals 150.

Apparatus-affixed cameras 130 may be affixed to the sides of baskets and carts. One camera 130 for a cart or a basket may be placed along a top edge of the cart or basket and pointed down into the basket or cart. Other cameras 130 for the cart or basket may be affixed to 2 or more sides of the cart or basket focused into the cart or basket.

In an embodiment, only apparatus-affixed cameras 130 are used for the embodiments discussed below.

In an embodiment, only in-store cameras 120 are used for the embodiments discussed below.

In an embodiment, a combination of in-store cameras and apparatus-affixed cameras 130 are used for the embodiments discussed below.

In an embodiment, 3 cameras 120 and/or 130 are used for the embodiments discussed below.

In an embodiment, 4 cameras 120 and/or 130 are used for the embodiments discussed below.

In an embodiment, 5 or more cameras 120 and/or 130 are used for the embodiments discussed below.

In an embodiment, one or all of the cameras 120 and/or 130 are depth cameras.

Each retail server 140 comprises at least one processor 141 and a non-transitory computer-readable storage medium 142. Medium 142 comprises executable instructions for a transaction manager 143. The executable instructions when provided or obtained by the processor 141 from medium 142 cause the processor 141 to perform operations discussed herein with respect to 143.

Each transaction terminal 150 comprises at least one processor 151 and a non-transitory computer-readable storage medium 152. Medium 152 comprises executable instructions for a transaction manager 153. The executable instructions when provided or obtained by the processor 151 from medium 152 cause the processor 151 to perform operations discussed herein with respect to 153.

Each user-operated device 160 comprises at least one processor 161 and a non-transitory computer-readable medium 162. Medium 162 comprises executable instructions for a retail application (app) 163. The executable instructions when provided or obtained by the processor 161 from medium 162 cause the processor 161 to perform operations discussed herein with respect to 163.

Initially, single items from a plurality of available items of a retailer are processed individually as follows. A transaction area associated with an inside of a cart, an inside of a basket, or a countertop surface of a transaction terminal 150 is divided into zones, the number of zones is configurable. In an embodiment, there are 6 zones. Each item is placed within one of the zones and multiple cameras 120 and/or 130 capture multiple images of the item in the corresponding zone. This is repeated for a next item until a configurable number of items are processed, such that there is a first corpus of first training images that comprises multiple images of each item from each zone captured by multiple cameras 120 and/or 130.

Each image in the first corpus of first training images comprises background pixels associated with the inside surface of the cart, the inside surface of the basket, or the top surface of the countertop.

The first corpus of first training images are managed by single item image capture manager 113. Once the first corpus of first training images have a sufficient number of items processed, manager 113 provides the first training image to trainer 116. Trainer 116 passes each image to a generically acquired segmentation MLM and receives as output a mask for the corresponding item representing in the corresponding image within a corresponding zone. Any output mask that is not of sufficient accuracy is discarded by trainer and all first training images of sufficient accuracy is retained as a second corpus of second training images and provided to single item image capture manager 113 to manage.

Next, multi-item scene generator 114 acquires images of the background without any items present (images of an empty cart, an empty basket, and blank countertop with no items thereon). Each background image representing a single image captured by one of the multiple cameras 120 and/or 130 of the inside of the cart, the inside of the basket, and the top of the countertop).

Once multi-item scene generator 113 has multiple empty (no item present) background images, generator 113 can randomly generate composite images using the empty background images or use rules to generate the composite image. Each composite image begins with a specific empty background image, and then selects two or more single item images from the second training images. Each single item image in the second training images have already been processed by the generic segmentation MLM, such that a mask representing the pixels for the corresponding item is identifiable from metadata associated with the corresponding single item image. This permits generator 114 to extract out from each single item image pixel data that corresponds to just the corresponding single item, ignoring the background pixels from the corresponding single item image. The extracted item image is then inserted into a corresponding empty background image within a selected zone. This is repeated for a different single item image until a composite image is created. The composite image comprises two or more item images (extracted from the second training images) and superimposed into a selected empty background image.

Next, label manager 115 knows the mask data for each item image within a given composite image and knows the pixel locations where each item image was superimposed into the corresponding empty background image by the generator 114, this allows label manager 115 to label the pixel outlines (boundaries) of each item image within the composite image. Once a labeled composite image is created and labeled, it is saved as multi-item scene image.

The generator 114 and label manager 115 repeat this processing for a new combination of items, the number of items varies (combinations and size of the combinations), and the item images used varies during each iteration (actual items). This continues for a predefined number of iterations until a third training set of images reaches a predefined number of labeled multi-item scene images is set aside as in a third training set of labeled multi-item scene images.

The third training set of labeled multi-item scene images are obtained by trainer 116 to engage the generic segmentation MLM in a training session with a robust set of labeled multi-item scene images. This creates a new segmentation MLM following the training session as segmentation MLM 117. Segmentation MLM 117 is robust and accurate on many different multi-item combinations.

Generator 114, label manager 115, and trainer 116 can repeat any number of iterations on new third training sets of labeled multi-image scene images to continuously train segmentation MLM 117. In an embodiment, generator 114 keeps track of previously used composite images (by item combinations and by each item's location within the zones for each combination), such that subsequent training sessions do not reuse a previously used composite image.

Once a desired accuracy of segmentation MLM 117 is reached, segmentation MLM 117 is released for use in providing item masks during transactions from multiple images at different angles of the transaction area that comprises multiple items in each of the multiple images.

Multi-item manager 119 receives the images taken of a transaction area and passes the images to segmentation MLM 117 and receives back item masks for each item within each of the image. The mask metadata (pixel boundaries and pixel locations within each image for each item) can be processed along with depth information associated with each masked area for each image in order to group or cluster each unique item from each image together with its corresponding masked areas and depth information associated with the remaining images.

The clustered masked areas for each item within the plurality of images acquired for the transaction area can be used to obtain the corresponding Red-Green-Blue data and pixel values for each item. Each items clustered RGB data and pixel values is then passed as input to a classification MLM 118. The classification MLM 118 is trained on the RGB data and pixel values to return an item code for each item represented in the transaction area during a transaction. Manager 119 receives each item code as output from the classification MLM 118 and provides the corresponding item code for each item within the transaction area to transaction manager 143 and/or transaction manager 153.

The item codes are processed to complete a transaction for a customer. The customer did not have to scan any item code whatsoever, rather, the items were placed together in any combination by the customer within the transaction area and system 100 returns the item codes for each of the items placed in the transaction area utilizing the multiple images provided by the multiple cameras 120 and/or 130 captured of the transaction area.

Because of the masked data provided by segmentation MLM 117 for any given item very precise crops of each portion of each item can be cropped from the multiple images of the transaction area. Additionally, precise cropping allows generator 114 to crop out precise item images from the single item images to create composite item combination images and allows label manager 115 to precisely label the boundaries within the composite item images into the labeled multi-item scene images.

Additionally, because generator 114 artificially and programmatically generates the composite multi-item images, the individual item images in a given composite multi-item image can be oriented in a manner that is not physically possible, such as a can of soda appearing to float above a countertop (background image portion) partially covering a bag of chips. Yet, these situations are still very helpful for training the segmentation MLM 117 to identify item boundaries (masks). Such situations as these cannot be achieved through manual training.

Still further, and to illustrate the significance of generating composite multi-item images programmatically for training the segmentation MLM 118, consider the following. If 100 items were desired for training, each item could be in 1 of 6 zones within the transaction area and 5 cameras were used, such that each camera captures the transaction area and produces its own unique image (5 total images of the transaction area), there is a total of 3000 training images 5×6×100). If there is also a rule that indicates that each zone can only occupy 1 zone of the 6 zones, then the number of permutations is 858,277,728,000 training images with different unique item combinations. This does not even consider that an item could be omitted from a zone nor that two items can overlap one another within a same zone, such that the true number of potential training images is well over 858 billion. Thus, system 100 provides a far superior labeling and training technique for any segmentation model, which is currently available in the industry. Segmentation MLM 117 is also significantly more accurate than any existing model because of the robustness of the training images and the training approach defined above.

In cases where the customer is using retail app 163 to self-shop and checkout of a store, retail app interacts with transaction manager 143 and transaction manager 143 records the item codes provided by manager 119, obtains the item pricing and item descriptions, and maintains an option within app 163 that the customer can select to see what is currently in the customer's cart or basket along with an option for the customer to checkout at any time.

In an embodiment, system 100 permits the elimination of item bar code scanning during checkouts at terminals 150 that are POS terminals operated by cashiers, permits elimination of item bar code scanning during self-checkouts at terminals 150 that are SSTs operated by the customers. Additionally, system 100 permits elimination of self-scanning by customers of the item bar codes when customers are using retail app 163; rather the customer simply places desired items for their transaction into their cart or basket and the item codes are automatically resolved by system 100 in the manners discussed above.

In an embodiment, the transaction area of the scene is 12 inches by 16 inches or roughly corresponds to the size of a cart, a food tray, a basket or a countertop at a convenience store.

These embodiments and other embodiments are now discussed with reference to the FIGS. 2-3.

FIG. 2 is a diagram of a method 200 for a MLM annotation and training technique, according to an example embodiment. The software module(s) that implements the method 200 is referred to as a "segmentation MLM trainer." The segmentation MLM trainer is implemented as executable instructions programmed and residing within memory and/or a non-transitory computer-readable (processor-readable) storage medium and executed by one or more processors of a device. The processor(s) of the device that executes the segmentation MLM trainer are specifically configured and programmed to process the segmentation MLM trainer. The segmentation MLM trainer has access to one or more network connections during its processing. The network connections can be wired, wireless, or a combination of wired and wireless.

In an embodiment, the segmentation MLM trainer executes on cloud 110. In an embodiment, the scene item identifier executes on server 110.

In an embodiment, the segmentation MLM trainer is all or some combination of 113, 114, 115, 116, 117, 118, and 119.

At 210, the segmentation MLM trainer provide single item images as input to an existing segmentation MLM. Each single item image depicting a single item within a transaction area (inside of a cart, inside of a basket, countertop of a transaction terminal 150, etc.).

In an embodiment, at 211, the segmentation MLM trainer provides multiple images for each single item within the transaction area.

In an embodiment of 211 and at 212, the segmentation MLM trainer provides a set of images for each single item within different zones (locations) of the transaction area. Each image of the set represents a unique angle or a unique perspective view of the corresponding single item within the corresponding zone.

At 220, the segmentation MLM trainer receives the output from the existing MLM for each single item image. Each mask identifies a set of pixels that represent the corresponding single item within the corresponding single item image.

In an embodiment, at 221, the segmentation MLM trainer filters out a number of the single item images based on accuracies of the existing segmentation MLM when producing the corresponding mask.

At 230, the segmentation MLM trainer obtains a background image depicting an empty version of the transaction area without any of the single items.

At 240, the segmentation MLM trainer generates composite multi-item images by using the masks for the single items and cropping each corresponding set of pixels from the corresponding single item images creating a cropped image and placing the cropped item image in combinations with one or more other cropped item images into the background image. Each composite multi-item image depicting two or more of the single items within the transaction area.

In an embodiment of 221 and 240, at 241, the segmentation MLM trainer uses remaining ones (the ones that were not filtered out) of the single item images as the single item images for generating the composite multi-item images at 240.

In an embodiment, at 242, the segmentation MLM trainer randomly selects the cropped item images, a size of each combination, and a total number of combinations for the composite multi-item images.

In an embodiment, at 243, the segmentation MLM trainer processes rules to determine the cropped item images, a size of each combination, and a total number of the combination for the composite multi-item images.

At 250, the segmentation MLM trainer labels boundaries for each cropped item image within the corresponding composite multi-item image based on the corresponding mask and a location that the corresponding cropped item image was placed in the corresponding composite multi-item image creating a labeled multi-item scene image for each composite multi-item image.

At 260, the segmentation MLM trainer derives an enhanced segmentation MLM 117 by training the existing MLM on the labeled multi-item scene images.

In an embodiment, at 270, the segmentation MLM trainer receives a set of transaction images for transaction items in the transaction area during a transaction. The segmentation MLM trainer obtains a set of current masks for the transaction items from the enhanced segmentation MLM 117 based on providing the set of transaction images. The segmentation MLM trainer clusters each current mask corresponding to a particular transaction item in the set of transaction images into an item mask cluster. The segmentation MLM trainer obtains a set of pixel values for each item mask cluster and the segmentation MLM trainer uses each set of pixel values to determine an item code for the corresponding transaction item.

In an embodiment of 270 and at 271, the segmentation MLM trainer provides each set of pixel values to a classification MLM 118 and receives the corresponding item code as output from the classification MLM 118.

In an embodiment of 271 and at 272, the segmentation MLM trainer provides the item codes corresponding to each transaction item to a transaction manager 143 and/or 153 that is processing the transaction for a customer checkout.

FIG. 3 is a diagram of another method 300 for a MLM annotation and training technique according to an example embodiment. The software module(s) that implements the method 200 is referred to as a "segmentation mask model trainer." The segmentation mask model trainer is implemented as executable instructions programmed and residing within memory and/or a non-transitory computer-readable (processor-readable) storage medium and executed by one or more processors of a device. The processor(s) of the device that executes the segmentation mask model trainer are specifically configured and programmed to process the segmentation mask model trainer. The segmentation mask model trainer has access to one or more network connections during its processing. The network connections can be wired, wireless, or a combination of wired and wireless.

In an embodiment, the device that executes the segmentation mask model trainer is cloud 110. In an embodiment, the device that executes the segmentation mask model trainer is server 110.

In an embodiment, the segmentation mask model trainer is all or some combination of 113, 114, 115, 116, 117, 118, 119, and/or method 200.

At 310, the segmentation mask model trainer generates transaction area scene images that comprise a combination of items using masks returned from an existing MLM that is provided the single item images for each item depicted within the transaction area.

In an embodiment, at 311, the segmentation mask model trainer crops each item from the corresponding single item images using the corresponding mask creating a cropped item image for each item.

In an embodiment of 311 and at 312, the segmentation mask model trainer obtains a background scene image without any item depicted for the transaction area.

In an embodiment at 312 and at 313, the segmentation mask model trainer defines zones within the background image. In an embodiment, there are 6 zones.

In an embodiment of 313 and at 314, the segmentation mask model trainer selects a size of a current combination, selects a number of the cropped item images that is equal to the size, selects a zone for each cropped item image, and generates a current transaction area scene image by placing each of the number of cropped item images into a corresponding selected zone within the background image.

In an embodiment of 314 and at 315, the segmentation mask model trainer iterates back to 314 for a predefined number of combinations.

In an embodiment, at 316, the segmentation mask model trainer filters out a number of the single item images to use with the generation of the transaction area scene images based on accuracies of the masks returned by the existing MLM.

At 320, the segmentation mask model trainer trains the existing MLM on a labeled version of each transaction area scene image. Each labeled version identifies pixel boundaries for each item within each transaction area scene image.

At 330, the segmentation mask model trainer creates an enhanced MLM 117 based on 320.

In an embodiment, the segmentation mask model trainer (310-330) is provided as a multi-item recognition service. The service uses the current masks returned by the enhanced MLM 117 for a set of images taken of the transaction area during a current transaction for transaction items. The segmentation mask model trainer clusters the masks into transaction item mask clusters, each transaction item mask cluster corresponding to pixel data for a particular transaction item obtained from the set of transaction images. The segmentation mask model trainer uses the corresponding pixel data associated with each transaction item mask cluster to resolve a transaction item code for each transaction item of the transaction without any transaction item being scanned during a checkout for the transaction.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

providing single item images as input to an existing segmentation Machine-Learning Model (MLM), wherein each single item image depicts a single item within a transaction area;

receiving a mask as output from the existing segmentation MLM for each single item image, wherein each mask identifies a set of pixels that represents a corresponding single item within a corresponding single item image;

obtaining a background image depicting an empty version of the transaction area without any item being depicted;

generating composite multi-item images by using a corresponding mask for a corresponding single item and cropping each corresponding set of pixels from the corresponding single item image creating a cropped item image and placing the cropped item image in combinations within one or more other cropped item images into the background image, wherein each composite multi-item image depicts two or more single items within the transaction area;

labeling boundaries for each cropped item image within a corresponding composite multi-item image based on a corresponding mask and a location that a corresponding cropped item image was placed in the corresponding composite multi-item image and creating a labeled multi-item scene image for each composite multi-item image; and deriving an enhanced segmentation MLM by training the existing segmentation MLM on each labeled multi-item scene image;

wherein the enhanced segmentation MLM is trained on multiple different combinations of items, each combination varies in both a number of items and actual items used during each iteration.

2. The method of claim 1, wherein providing further includes providing multiple images of each single item within the transaction area.

3. The method of claim 2, wherein providing further includes providing a set of the multiple images for each single item that depicts the corresponding single item within different zones of the transaction area, each image of a corresponding set representing a unique angle or unique perspective view of the corresponding single item within a corresponding zone.

4. The method of claim 1, wherein receiving further includes filtering the single item images based on accuracies of the existing segmentation MLM when producing the mask.

5. The method of claim 4, wherein generating further includes using remaining ones of the single item images as the single item images for generating the composite multi-item images.

6. The method of claim 1, wherein generating further includes randomly selecting cropped item images, a size of each combination, and a total number of the combinations.

7. The method of claim 1, wherein generating further includes processing rules to determine selection of cropped item images, a size of each combination, and a total number of the combinations.

8. The method of claim 1 further comprising:

receiving a set of transaction item images for transaction items in the transaction area during a transaction;

obtaining a set of masks for the transaction items from the enhanced segmentation MLM based on the set of transaction item images;

clustering each mask corresponding to a particular transaction item in the set of transaction item images together in an item mask cluster;

obtaining a set of pixel values for each item mask cluster; and using each set of pixel values to determine an item code for a corresponding transaction item.

9. The method of claim 8, wherein using further includes providing each set of pixel values to a classification MLM and receiving a corresponding item code as output.

10. The method of claim 9 further comprising, providing the item code corresponding to each transaction item to a transaction manager processing the transaction for a checkout.

11. A system, comprising:

a server comprising at least one processor and a non-transitory computer-readable storage medium;

the non-transitory computer-readable storage medium comprises executable instructions; and the executable instructions when executed by the at least one processor from the non-transitory computer-readable storage medium cause the at least one processor to perform operations comprising:

obtaining masks for items from an existing Machine-Learning Model (MLM) by providing the existing MLM with single item images depicting a single item depicted within a transaction area in a plurality of different zones of the transaction area;

cropping the items from the single item images using the masks and obtaining cropped item images;

creating multi-item scene images of the items within the transaction area in different combinations and different locations of the plurality of different zones by superimposing the cropped item images into a background image for the transaction area;

using the different locations and the masks to label outlines of each of the cropped item images in each of the multi-item scene images creating labeled multi-item scene images; and training the existing MLM on the labeled multi-item scene images producing an enhanced MLM;

wherein the enhanced MLM is continuously trained on new third training sets of labeled multi-image scene images.

12. The system of claim 11, wherein the transaction area is associated with an inside of a cart, an inside of a basket, or a top surface of a countertop for a transaction terminal.

\* \* \* \* \*